United States Patent Office.

ZDENKO HANNS SKRAUP, OF VIENNA, AUSTRIA-HUNGARY, ASSIGNOR TO THE BADISCHE ANILIN AND SODA FABRIK, OF MANNHEIM, GERMANY.

PRODUCTION OF TETRAHYDRO-PARACHINANISOL.

SPECIFICATION forming part of Letters Patent No. 308,286, dated November 18, 1884.

Application filed August 21, 1884. (No specimens.)

*To all whom it may concern:*

Be it known that I, ZDENKO HANNS SKRAUP, a subject of the Emperor of Austria-Hungary, residing at Vienna, in the Empire of Austria-Hungary, have invented new and useful Improvements in Tetrahydro - Parachinanisol (Thalline) Produced from Parachinanisol and Nascent Hydrogen, of which the following is a specification.

This invention relates to the production of tetrahydro-parachinanisol—a substance which I have termed "thalline," and which is intended for the manufacture of medical compounds and for other purposes.

My invention is based on the discovery that parachinanisol, which substance forms the subject-matter of Letters Patent No. 295,825, granted to me and dated March 25, 1884, may be converted into tetrahydro-parachinanisol by the action of nascent hydrogen.

As an example of the manner in which my invention may be carried into effect, I proceed as follows: Four parts, by weight, of granulated tin and fifteen parts, by weight, of hydrochloric acid of about 1.14 specific gravity are added to one part, by weight, of the hydrochlorate of parachinanisol, and the mixture thus obtained is then digested at the temperature of about 100° centigrade during from eight to ten hours, or until a difficultly-soluble double compound of chloride of tin with the hydrochlorate of my new hydrogenized base begins to separate out. The mixture is then allowed to cool, and the abundant crop of white tabular crystals of the tin compound thus obtained is mechanically separated from the mother-liquor. I then recover the tin contained in the said crystals by treating the same with zinc and boiling water until no longer a precipitation of tin takes place. The solution thus obtained is then rendered strongly alkaline by the addition of caustic-soda liquor, when the hydrogenized base thus set free separates out as an oily layer, which upon cooling solidifies into a mass of hard crystals. Tetrahydro-parachinanisol, prepared in the manner above described, is a strong organic base, the composition of which corresponds to the formula $C_{10}H_{13}NO$. It forms saline compounds with mineral and organic acids. Its sulphate, hydrochlorate, oxalate, and tartrate are well crystallizable salts, soluble in water. The hydrochlorate forms a double compound with chloride of zinc, crystallizing in colorless needles. The free base is sparingly soluble in cold water and more readily so in boiling water. It easily dissolves in alcohol, sulphuric ether, and petroleum spirit. From its alcoholic solution it may be obtained in white well-developed prismatic crystals. Tetrahydro-parachinanisol fuses at 42° to 43° centigrade, and boils at 282° to 283° centigrade (uncorrected) without undergoing decomposition. The chlorides, bromides, and iodides of the alcohol radicals are capable of converting tetrahydro-parachinanisol into its corresponding alcylized derivatives.

By the action of chloride of benzyle, a benzylate compound of my new base may be obtained.

The most characteristic reaction of tetrahydro-parachinanisol consists in the development of an intensely green color whenever perchloride of iron, bichromate of potash, or an aqueous solution of chlorine is allowed to act upon the free base or its saline compounds. On account of the said extremely sensitive reaction, I designate tetrahydro-parachinanisol with the short and characteristic name of "thalline."

What I claim as new, and desire to secure by Letters Patent, is—

As a new product, the tetrahydro-parachinanisol, hereinbefore described, produced from parachinanisol and nascent hydrogen, and having the qualities herein set forth.

In testimony whereof I have hereunto set my hand and seal in the presence of two subscribing witnesses.

ZDENKO HANNS SKRAUP. [L. S.]

Witnesses:
LUDWIG CAMILLO HAITINGER,
JOSEF ZERZIG.